US009775062B2

United States Patent
Tanaka et al.

(10) Patent No.: US 9,775,062 B2
(45) Date of Patent: Sep. 26, 2017

(54) MOBILE TERMINAL TESTING APPARATUS AND SCENARIO INFORMATION SETTING METHOD FOR USE IN MOBILE TERMINAL TESTING APPARATUS

(71) Applicant: ANRITSU CORPORATION, Kanagawa (JP)

(72) Inventors: Junya Tanaka, Kanagawa (JP); Yasuyuki Matsuyama, Kanagawa (JP); Taro Ishida, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 176 days.

(21) Appl. No.: 14/942,252

(22) Filed: Nov. 16, 2015

(65) Prior Publication Data

US 2016/0219449 A1    Jul. 28, 2016

(30) Foreign Application Priority Data

Jan. 26, 2015   (JP) ................................. 2015-012794

(51) Int. Cl.
*H04W 24/08* (2009.01)
*H04W 88/08* (2009.01)
*H04W 72/02* (2009.01)

(52) U.S. Cl.
CPC ............ *H04W 24/08* (2013.01); *H04W 72/02* (2013.01); *H04W 88/08* (2013.01)

(58) Field of Classification Search
None
See application file for complete search history.

(56) References Cited

U.S. PATENT DOCUMENTS

2016/0073310 A1*   3/2016   Hapsari ................. H04W 36/08
                                                                              455/437

FOREIGN PATENT DOCUMENTS

JP             2008-199085 A       8/2008

\* cited by examiner

*Primary Examiner* — Christine Duong
(74) *Attorney, Agent, or Firm* — Pearne & Gordon LLP (57) ABSTRACT

Provided is a mobile terminal testing apparatus capable of easily performing testing using a MFBI. The mobile terminal testing apparatus includes a display unit 12, and a control unit 14 that displays on the display unit 12 an image indicating a position on a frequency axis, of a selection frequency band that is selected as a frequency band which is used by a pseudo-base station unit, and an image indicating a position on the frequency axis, of an available frequency band that is able to be set as the MFBI with which the selection frequency band is overlapping, in such a manner that a positional relationship between both of the images is identifiable.

8 Claims, 6 Drawing Sheets

| E-UTRA Operating Band | Uplink (UL) operating band BS receive UE transmit $F_{UL\_low} - F_{UL\_high}$ | Downlink (DL) operating band BS transmit UE receive $F_{DL\_low} - F_{DL\_high}$ | Duplex Mode |
|---|---|---|---|
| 1 | 1920 MHz – 1980 MHz | 2110 MHz – 2170 MHz | FDD |
| 2 | 1850 MHz – 1910 MHz | 1930 MHz – 1990 MHz | FDD |
| 3 | 1710 MHz – 1785 MHz | 1805 MHz – 1880 MHz | FDD |
| 4 | 1710 MHz – 1755 MHz | 2110 MHz – 2155 MHz | FDD |
| 5 | 824 MHz – 849 MHz | 869 MHz – 894MHz | FDD |
| 6 | 830 MHz – 840 MHz | 875 MHz – 885 MHz | FDD |
| 7 | 2500 MHz – 2570 MHz | 2620 MHz – 2690 MHz | FDD |
| 8 | 880 MHz – 915 MHz | 925 MHz – 960 MHz | FDD |
| 9 | 1749.9 MHz – 1784.9 MHz | 1844.9 MHz – 1879.9 MHz | FDD |
| 10 | 1710 MHz – 1770 MHz | 2110 MHz – 2170 MHz | FDD |
| 11 | 1427.9 MHz – 1447.9 MHz | 1475.9 MHz – 1495.9 MHz | FDD |
| 12 | 699 MHz – 716 MHz | 729 MHz – 746 MHz | FDD |
| 13 | 777 MHz – 787 MHz | 746 MHz – 756 MHz | FDD |
| 14 | 788 MHz – 798 MHz | 758 MHz – 768 MHz | FDD |
| 15 | Reserved | Reserved | FDD |
| 16 | Reserved | Reserved | FDD |
| 17 | 704 MHz – 716 MHz | 734 MHz – 746 MHz | FDD |
| 18 | 815 MHz – 830 MHz | 860 MHz – 875 MHz | FDD |
| 19 | 830 MHz – 845 MHz | 875 MHz – 890 MHz | FDD |
| 20 | 832 MHz – 862 MHz | 791 MHz – 821 MHz | FDD |
| 21 | 1447.9 MHz – 1462.9 MHz | 1495.9 MHz – 1510.9 MHz | FDD |
| 22 | 3410 MHz – 3490 MHz | 3510 MHz – 3590 MHz | FDD |
| 23 | 2000 MHz – 2020 MHz | 2180 MHz – 2200 MHz | FDD |
| 24 | 1626.5 MHz – 1660.5 MHz | 1525 MHz – 1559 MHz | FDD |
| 25 | 1850 MHz – 1915 MHz | 1930 MHz – 1995 MHz | FDD |
| 26 | 814 MHz – 849 MHz | 859 MHz – 894 MHz | FDD |
| 27 | 807 MHz – 824 MHz | 852 MHz – 869 MHz | FDD |
| 28 | 703 MHz – 748 MHz | 758 MHz – 803 MHz | FDD |
| 29 | N/A | 717 MHz – 728 MHz | FDD |
| 30 | 2305 MHz – 2315 MHz | 2350 MHz – 2360 MHz | FDD |
| 31 | 452.5 MHz – 457.5 MHz | 462.5 MHz – 467.5 MHz | FDD |
| ... | | | |
| 33 | 1900 MHz – 1920 MHz | 1900 MHz – 1920 MHz | TDD |
| 34 | 2010 MHz – 2025 MHz | 2010 MHz – 2025 MHz | TDD |
| 35 | 1850 MHz – 1910 MHz | 1850 MHz – 1910 MHz | TDD |
| 36 | 1930 MHz – 1990 MHz | 1930 MHz – 1990 MHz | TDD |
| 37 | 1910 MHz – 1930 MHz | 1910 MHz – 1930 MHz | TDD |
| 38 | 2570 MHz – 2620 MHz | 2570 MHz – 2620 MHz | TDD |
| 39 | 1880 MHz – 1920 MHz | 1880 MHz – 1920 MHz | TDD |
| 40 | 2300 MHz – 2400 MHz | 2300 MHz – 2400 MHz | TDD |
| 41 | 2496 MHz – 2690 MHz | 2496 MHz – 2690 MHz | TDD |
| 42 | 3400 MHz – 3600 MHz | 3400 MHz – 3600 MHz | TDD |
| 43 | 3600 MHz – 3800 MHz | 3600 MHz – 3800 MHz | TDD |
| 44 | 703 MHz – 803 MHz | 703 MHz – 803 MHz | TDD |

FIG. 3

| E-UTRA Operating Band | Overlapping E-UTRA operating bands | Duplex Mode |
|---|---|---|
| 2 | 25 | FDD |
| 3 | 9 | FDD |
| 4 | 10 | FDD |
| 5 | 18, 19, 26 | FDD |
| 9 | 3 | FDD |
| 10 | 4 | FDD |
| 12 | 17 | FDD |
| 17 | 12 | FDD |
| 18 | 5, 26, 27 | FDD |
| 19 | 5, 26 | FDD |
| 25 | 2 | FDD |
| 26 | 5, 18, 19, 27 | FDD |
| 27 | 18, 26 | FDD |
| 33 | 39 | TDD |
| 38 | 41 | TDD |
| 39 | 33 | TDD |
| 41 | 38 | TDD |

FIG. 4

| E-UTRA band / Channel bandwidth |||||||
|---|---|---|---|---|---|---|
| E-UTRA Band | 1.4 MHz | 3 MHz | 5 MHz | 10 MHz | 15 MHz | 20 MHz |
| 1 | | | Yes | Yes | Yes | Yes |
| 2 | Yes | Yes | Yes | Yes | Yes | Yes |
| 3 | Yes | Yes | Yes | Yes | Yes | Yes |
| 4 | Yes | Yes | Yes | Yes | Yes | Yes |
| 5 | Yes | Yes | Yes | Yes | | |
| 6 | | | Yes | Yes | | |
| 7 | | | Yes | Yes | Yes | Yes |
| 8 | Yes | Yes | Yes | Yes | | |
| 9 | | | Yes | Yes | Yes | Yes |
| 10 | | | Yes | Yes | Yes | Yes |
| 11 | | | Yes | Yes | | |
| 12 | Yes | Yes | Yes | Yes | | |
| 13 | | | Yes | Yes | | |
| 14 | | | Yes | Yes | | |
| ... | | | | | | |
| 17 | | | Yes | Yes | | |
| 18 | | | Yes | Yes | Yes | |
| 19 | | | Yes | Yes | Yes | |
| 20 | | | Yes | Yes | Yes | Yes |
| 21 | | | Yes | Yes | Yes | |
| 22 | | | Yes | Yes | Yes | Yes |
| 23 | Yes | Yes | Yes | Yes | Yes | Yes |
| 24 | | | Yes | Yes | | |
| 25 | Yes | Yes | Yes | Yes | Yes | Yes |
| 26 | Yes | Yes | Yes | Yes | Yes | |
| 27 | Yes | Yes | Yes | Yes | | |
| 28 | | Yes | Yes | Yes | Yes | Yes |
| 30 | | | Yes | Yes | | |
| 31 | Yes | Yes | Yes | | | |
| ... | | | | | | |
| 33 | | | Yes | Yes | Yes | Yes |
| 34 | | | Yes | Yes | Yes | |
| 35 | Yes | Yes | Yes | Yes | Yes | Yes |
| 36 | Yes | Yes | Yes | Yes | Yes | Yes |
| 37 | | | Yes | Yes | Yes | Yes |
| 38 | | | Yes | Yes | Yes | Yes |
| 39 | | | Yes | Yes | Yes | Yes |
| 40 | | | Yes | Yes | Yes | Yes |
| 41 | | | Yes | Yes | Yes | Yes |
| 42 | | | Yes | Yes | Yes | Yes |
| 43 | | | Yes | Yes | Yes | Yes |
| 44 | | Yes | Yes | Yes | Yes | Yes |

MOBILE TERMINAL TESTING APPARATUS AND SCENARIO INFORMATION SETTING METHOD FOR USE IN MOBILE TERMINAL TESTING APPARATUS

TECHNICAL FIELD

The present invention relates to a mobile terminal testing apparatus that performs testing of a mobile communication terminal.

BACKGROUND ART

In a case where mobile communication terminals such as a portable telephone and a data communication terminal are developed, there is a need to test whether or not these developed mobile communication terminals perform communication normally. For this reason, a mobile communication terminal that is a testing target is connected to a testing apparatus that operates as a pseudo-base station that simulates an actual base station, and communication is performed between the testing apparatus and the mobile communication terminal. Thus, testing is performed for checking contents of the communication.

The testing apparatus operates in accordance with a testing scenario (hereinafter simply referred to as a scenario) that is generated in advance. An operation configuration of the testing apparatus, a sequence of communication with the mobile communication terminal, or the like is set in the scenario. The scenario needs to be created for every item for the testing that is performed. A scenario creator creates various scenarios using a scenario generation apparatus or the testing apparatus. Such a scenario generation apparatus is disclosed in Patent Document 1.

RELATED ART DOCUMENT

Patent Document

[Patent Document 1] JP-A-2008-199085

DISCLOSURE OF THE INVENTION

Problem that the Invention is to Solve

Incidentally, in standards for Long Term Evolution (LTE) that is a wireless communication scheme, multiple frequency bands (each of which is hereinafter simply referred to as a "band"), each of which is a frequency band that is used for communication, are determined, and each band is assigned, for use, to a communications carrier. A base station can perform communication using a band that is assigned to the communications carrier to which the base station belongs. The base station always notifies a mobile communication terminal of one band that is used for communication, in a state of being set to be in broadcast information.

Among multiple bands, there are present bands whose frequency bands to be used overlap. In a base station that uses one, among bands of which frequency bands overlap, for communication, if there are present frequency bands that overlap, any mobile communication terminal that uses a band that is not assigned to the communications carrier to which the base station belongs can perform communication. In this manner, if communication in bands that overlap is also set to be possible, the mobile communication terminal that cannot use a band that is used by the base station can also perform communication. Thus, convenience is improved.

In order to realize this function, the mobile communication terminal needs to know in which band a base station can perform communication. For this reason, in the standards for LTE, a multi-frequency band indicator (MFBI), as information on a band in which communication is possible, is set to be in the broadcast information.

In a case where a scenario for the base station that uses the MFBI is created, the frequency band that is used by the base station for communication has to be designated for a portion in which the bands overlap. However, because the frequency band differs with a band, the portion in which the bands overlap is difficult to know and a setting is not easy to perform.

Here, an object of the present invention is to provide a mobile terminal testing apparatus that is capable of easily performing testing using a MFBI.

Means for Solving the Problem

According to an aspect of the present invention, there is provided a mobile terminal testing apparatus that tests a mobile communication terminal by simulating a mobile-communication base station, the mobile terminal testing apparatus including: a pseudo-base station unit (18) that simulates the mobile-communication base station; a display unit; and a control unit that displays a setting image for performing various settings, on the display unit, in which, when information on a multi-frequency band indicator (MFBI) is set, the control unit displays on the display unit an image indicating a position on a frequency axis, of a selection frequency band that is selected as a frequency band which is used by the pseudo-base station unit, and displays on the display unit an image indicating a position on the frequency axis, of an available frequency band that is able to be set as the MFBI with which the selection frequency band is overlapping, in such a manner that a positional relationship on the frequency axis between the image indicating the position on the frequency axis, of the available frequency band and the image indicating the position on the frequency axis, of the selection frequency band is identifiable.

With this configuration, the relationship between the frequency band (the selection frequency band) that is selected as the frequency band which is used by the pseudo-base station unit, and the available frequency band that can be set as the MFBI is displayed on the display unit. For this reason, a portion in which the selection frequency band and the available frequency band that can be set as the MFBI overlap can be checked visually, and testing using the MFBI can be performed easily.

In the mobile terminal testing apparatus according to the present invention, the control unit may display on the display unit an image indicating a position of a center frequency that is selected as a center frequency which is used by the pseudo-base station unit for communication, in a state of being superimposed on the image indicating the position of the selection frequency band and the image indicating the position on the frequency axis, of the available frequency band that is able to be set as the MFBI.

With this communication, a relationship between the center frequency that is selected as the center frequency which is used by the pseudo-base station unit for communication, the selection frequency band, and the available frequency band that can be set as the MFBI is displayed on the display unit. For this reason, the center frequency that is selected as the center frequency which is used by the pseudo-base station unit for communication, and the portion in which the selection frequency band and the available frequency band that can be set as the MFBI overlap can be checked visually, and the testing using the MFBI can be performed easily.

Furthermore, in the mobile terminal testing apparatus according to the present invention, the control unit may display on the display unit an image indicating a bandwidth that is selected as a bandwidth which is used by the pseudo-base station unit for communication, in a state of being superimposed on the image indicating the position of the center frequency.

With this configuration, a relationship between the center frequency and the bandwidth that are selected as the center frequency and the bandwidth which are used by the pseudo-base station unit, the selection frequency band, and the available frequency band that can be set as the MFBI is displayed on the display unit. For this reason, the center frequency and the bandwidth that are selected as the center frequency and the bandwidth, respectively, and that are used by the pseudo-base station unit, and the portion in which the selection frequency band and the available frequency band that can be set as the MFBI overlap can be checked visually, and the testing using the MFBI can be performed easily.

Furthermore, in the mobile terminal testing apparatus according to the present invention, the control unit may set the image indicating the position on the frequency axis, of the available frequency band that is able to be set as the MFBI, to be an image that is different for the available frequency band that is selected as the MFBI which is used by the pseudo-base station unit, and the available frequency band that is not selected as the MFBI which is used by the pseudo-base station unit.

With this configuration, the available frequency band that is selected as the MFBI which is used by the pseudo-base station unit and the available frequency band that is not selected as the MFBI which is used by the pseudo-base station unit are displayed on the display unit, using different images. For this reason, the available frequency band that is selected as the MFBI which is used by the pseudo-base station unit, and the available frequency band that is not selected as the MFBI which is used by the pseudo-base station unit can be checked visually and the testing using the MFBI can be performed easily.

According to another aspect of the present invention, there is provided a scenario information setting method for use in a mobile terminal testing apparatus that includes a pseudo-base station unit that tests a mobile communication terminal and that simulates a mobile-communication base station, the scenario information setting method including: displaying an image indicating a position on a frequency axis, of a selection frequency band that is selected as a frequency band which is used by the pseudo-base station unit when information on a multi-frequency band indicator (MFBI) is set; and displaying an image indicating a position on the frequency axis, of an available frequency band which is able to be set as the MFBI with which the selection frequency band is overlapping, in such a manner that a positional relationship on the frequency axis between the image indicating the position on the frequency axis, of the available frequency band and the image indicating the position on the frequency axis, of the selection frequency band is identifiable.

Furthermore, the scenario information setting method according to the present invention may further include displaying an image indicating a position of a center frequency that is selected as a center frequency which is used by the pseudo-base station unit for communication, in a state of being superimposed on the image indicating the position on the frequency axis, of the selection frequency band and the image indicating the position on the frequency axis, of the available frequency band that is able to be set as the MFBI.

Furthermore, the scenario information setting method according to the present invention may further include displaying an image indicating a bandwidth that is selected as a bandwidth which is used by the pseudo-base station unit, in a state of being superimposed on the image indicating the position of the center frequency.

Furthermore, the scenario information setting method according to the present invention may further include displaying the image indicating the position on the frequency axis, of the available frequency band that is able to be set as the MFBI, as an image that is different for the available frequency band that is selected as the MFBI which is used by the pseudo-base station unit, and the available frequency band that is not selected as the MFBI which is used by the pseudo-base station unit.

With this configuration, the relationship between the selection frequency band and the available frequency band that can be set as the MFBI is displayed. For this reason, the portion in which the selection frequency band and the available frequency band that can be set as the MFBI overlap can be checked visually, and the testing using the MFBI can be performed easily.

Advantage of the Invention

The present invention can provide a mobile terminal testing apparatus that can easily perform testing using a MFBI.

BRIEF DESCRIPTION OF THE DRAWINGS

FIG. 3 is a table illustrating frequency bands of LTE bands that are used by the mobile terminal testing apparatus according to one embodiment of the present invention.

BEST MODE FOR CARRYING OUT THE INVENTION

Embodiments of the present invention will be described in detail referring to the drawings.

Figure 1:
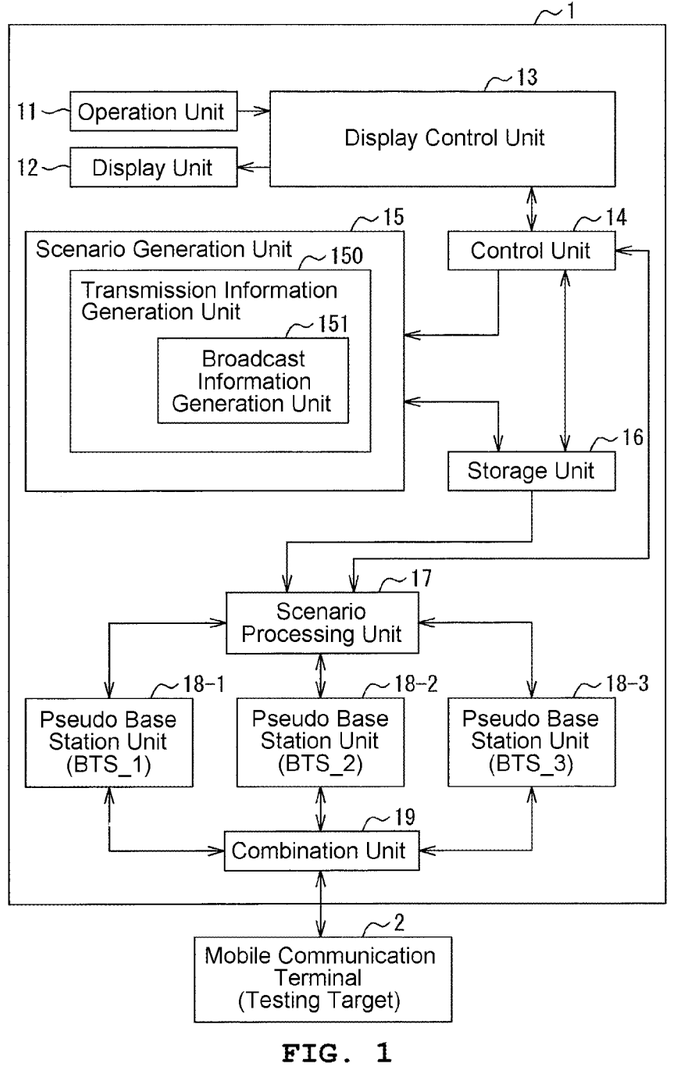
FIG. 1 is a block diagram of a mobile terminal testing apparatus according to one embodiment of the present invention.

In FIG. 1, a mobile terminal testing apparatus 1 according to one embodiment of the present invention is set to transmit and receive a radio signal to and from a mobile communication terminal 2 in a wired manner through a coaxial cable or the like, as a pseudo-base station.

The mobile terminal testing apparatus 1 is configured to include an operation unit 11, a display unit 12, a display control unit 13, a control unit 14, a scenario generation unit 15, a storage unit 16, a scenario processing unit 17, pseudo-base station units 18-1 to 18-3, and a combination unit 19.

The operation unit 11 is configured as an input device such as a keyboard, a mouse, and a touch panel, and outputs information necessary for generation of a scenario that is input by operating the operation unit 11, to the display control unit 13. The display unit 12 is configured as an image display device such as a liquid crystal display, and an image through which information necessary for scenario generation is input, an image indicating a testing-in-progress state, or the like is displayed on the display unit 12.

The display control unit 13 generates an image that is to be displayed on the display unit 12 and then displays the image on the display unit 12, and is set to perform image generation and display control according to an instruction of the control unit 14. Furthermore, the display control unit 13 changes display on the display unit 12, based on information that is input into the operation unit 11, or transmits to the control unit 14 the information that is input into the operation unit 11.

In accordance with an instruction that is input into the operation unit 11, the control unit 14 causes the display control unit 13 to display a scenario creation screen on the display unit 12 and causes the information necessary for the scenario generation to be input, or transmits information that is input into the operation unit 11 through the scenario creation screen to the scenario generation unit 15, and thus generates a scenario. Furthermore, in accordance with the instruction that is input into the operation unit 11, the control unit 14 transmits the instruction to the scenario processing unit 17 and performs testing, based on a scenario that is stored in the storage unit 16, or causes the display control unit 13 to display a testing-in-progress state on the display unit 12, based on information, such as a state of each of the pseudo-base station units 18-1 to 18-3 or a state of communication with the mobile communication terminal 2, which is transmitted from the scenario processing unit 17.

Based on the information for the scenario generation that is transmitted from the control unit 14, the scenario generation unit 15 generates a scenario for testing the mobile communication terminal 2. Operation of each of the pseudo-base station units 18-1 to 18-3 or a sequence of communication between each of the pseudo-base station units 18-1 to 18-3 and the mobile communication terminal 2 is set to be in the scenario. The scenario generation unit 15 includes a transmission information generation unit 150 that generates transmission information that is transmitted from each of the pseudo-base station units 18-1 to 18-3, based on the information for the scenario generation.

Based on the information for the scenario generation, the transmission information generation unit 150 generates broadcast information of each of the pseudo-base station units 18-1 to 18-3, transmission information in location registration processing, or the like. The transmission information generation unit 150 includes a broadcast information generation unit 151 that generates the broadcast information.

The broadcast information generation unit 151, for example, generates the broadcast information, based on setting information on operation of each of the base stations that simulates the pseudo-base station units 18-1 to 18-3 that are set individually. Furthermore, the broadcast information generation unit 151 automatically generates neighboring-cell information for the broadcast information and the like, based on information on an in-cell arrangement of the base stations that simulate the pseudo-base station units 18-1 to 18-3.

The storage unit 16 is configured as a hard disk drive or a flash memory, and various scenarios that are generated in the scenario generation unit 15 are stored in the storage unit 16.

According to the instruction from the control unit 14, the scenario processing unit 17 reads a scenario that is stored in the storage unit 16. Based on the scenario that is read, the scenario processing unit 17 causes the pseudo-base station units 18-1 to 18-3 to transmit broadcast information or to perform the sequence of communication between each of the pseudo-base station units 18-1 to 18-3 and the mobile communication terminal 2.

According to an instruction of the scenario processing unit 17, each of the pseudo-base station units 18-1 to 18-3 transmits and receives radio signals to and from the mobile communication terminal 2.

The combination unit 19 combines radio signals that are transmitted by the pseudo-base station units 18-1 to 18-3, and transmits the resulting signal to the mobile communication terminal 2. Furthermore, the combination unit 19 transmits to each of that pseudo-base station units 18-1 to 18-3 a signal that is received from the mobile communication terminal 2.

The mobile terminal testing apparatus 1 here is configured as a computer-like apparatus not illustrated, to which a communication module is provided for performing the communication with the mobile communication terminal 2. Such a computer-like apparatus has a central processing unit (CPU), a read only memory (ROM), a random access memory (RAM), a hard disk drive, an input and output port, and a touch panel, all of which are not illustrated.

Stored in the ROM and the hard disk drive of the computer-like apparatus is a program for causing the computer-like apparatus to function as the mobile terminal testing apparatus 1. That is, the computer-like apparatus functions as the mobile terminal testing apparatus 1 by the CPU executing the program that is stored in the ROM with the RAM as a working area.

In this manner, according to the present embodiment, the storage unit 16 is configured as the RAM or the hard disk drive, the display control unit 13, the control unit 14, the scenario generation unit 15, and the scenario processing unit 17 are configured as the CPU, and the pseudo-base station units 18-1 to 18-3 are configured as the communication module.

In a case where testing of the mobile communication terminal 2 is performed with the mobile terminal testing apparatus 1 that has such a configuration, first, a scenario that is used for testing is created by a user. When a function of creating a scenario is selected by the user operating the operation unit 11, for example, the control unit 14 displays the scenario creation screen on the display unit 12 to set information of each of the base stations that simulate the pseudo-base station units 18-1 to 18-3, a sequence that the user wants to perform, or the like.

The user sets various pieces of information that are necessary for intended testing, for every base station. The control unit 14 transmits to the scenario generation unit 15 the pieces of information that are set, and thus generates a scenario for a pseudo-base station. Based on information that is received from the control unit 14, the scenario generation unit 15 generates broadcast information, sequence information, or the like, and stores the generated information, as the scenario for the pseudo-base station, in the storage unit 16, in a state of being associated with identification information.

Furthermore, in a case where testing is performed in which multiple base stations are used, the user sets an in-cell arrangement of the multiple base stations. The control unit 14 transmits information on the in-cell arrangement that is set, to the scenario generation unit 15, and generates a scenario for in-cell arrangement. Based on the information on the in-cell arrangement that is received from the control unit 14, the scenario generation unit 15 automatically generates neighboring-cell information for broadcast information of a scenario for a pseudo-base station that is set as a pseudo-base station that is to be used, or the like, and stores the generated information, in a state of being associated with the scenario for the pseudo-base station that is to be used as a scenario for in-cell arrangement and with identification information, in the storage unit 16.

After such a scenario is created, the user connects the mobile terminal testing apparatus 1 and the mobile communication terminal 2 to each other in a wired manner, and selects a scenario for a pseudo-base station that is to be used, or a scenario for an in-cell arrangement.

The control unit 14 notifies the scenario processing unit 17 of the scenario for the pseudo-base station that is selected, or the identification information of the scenario for the in-cell arrangement, and causes the scenario processing unit 17 to play out the scenario.

The scenario processing unit 17 reads the scenario that is associated with the identification information that is notified, from the storage unit 16, notifies the pseudo-base station units 18-1 to 18-3 of contents of the broadcast information, the transmission information in the location registration processing, or the like, based on the scenario that is read, and causes the pseudo-base station units 18-1 to 18-3 to operate as pseudo-base stations.

Furthermore, when the scenario starts to be played out, the scenario processing unit 17 is set to notify the control unit 14 of states of the pseudo-base station units 18-1 to 18-3 for which the scenario is played out.

When receiving pieces of information on the states of the pseudo-base station units 18-1 to 18-3 from the scenario processing unit 17, the control unit 14 causes the display control unit 13 to display the states of the pseudo-base station units 18-1 to 18-3, a connected state of the mobile communication terminal 2, or the like on the display unit 12.

After the scenario for the pseudo-base station that is to be used is selected, the user performs location registration, such as powering-on of the mobile communication terminal 2, and checks whether or not the location registration is normally performed at the mobile terminal testing apparatus 1 side.

When an operation that is to perform a sequence that is set to be in the scenario for the pseudo-base station is performed by the user operating the operation unit 11 in a state where the location registration is performed, the control unit 14 instructs the scenario processing unit 17 to perform the designated sequence.

When receiving an instruction to perform the sequence from the control unit 14, based on information on the designated sequence, the scenario processing unit 17 transmits a radio signal from each of the pseudo-base station units 18-1 to 18-3, or transmits a radio signal in response to a radio signal that is received from the mobile communication terminal 2, from each of the pseudo-base station units 18-1 to 18-3.

Figure 2:
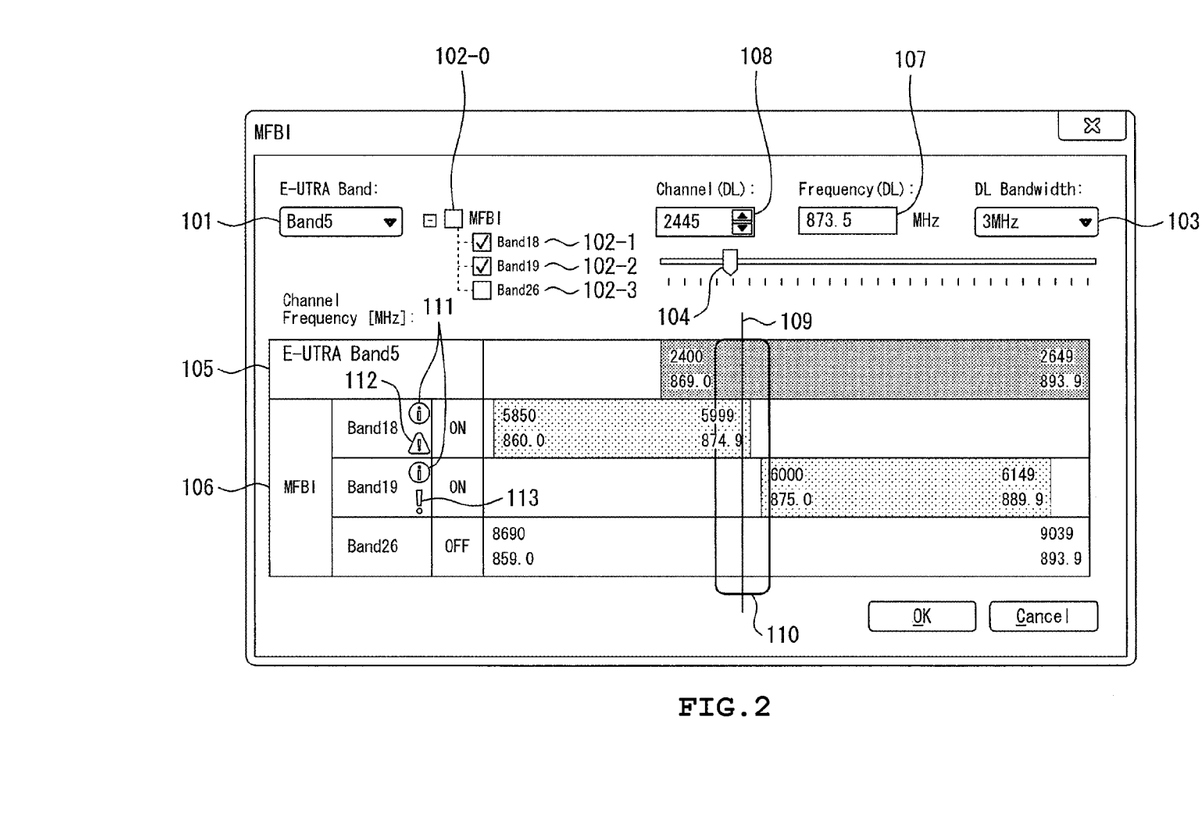
FIG. 2 is a diagram illustrating an MFBI information setting screen of the mobile terminal testing apparatus according to one embodiment of the present invention.

In a case where setting of information on the MFBI is selected in the above-described mobile terminal testing apparatus 1 by operating the operation unit 11, the control unit 14 causes the display control unit 13 to display a screen as illustrated in FIG. 2 on the display unit 12, and causes the MFBI information to be set by operating the operation unit 11.

In FIG. 2, the band drop-down list 101 is for setting frequency bands (selection frequency bands) that are used in the pseudo-base station. Among the bands (the selection frequency bands) that are selected from the band drop-down list 101, the control unit 14 displays bands (available frequency bands) that can be designated for an MFBI, as MFBI check boxes 102-0 to 102-3.

Furthermore, the control unit 14 displays positions on a frequency axis, of frequency bands of the bands (the selection frequency bands) selected from the band drop-down list 101, on a band display section 105, for example, in a colored manner. Moreover, the control unit 14 displays the positions on the frequency axis, of the frequency bands of the bands (the available frequency bands) that can be designated for the MFBI, on an MFBI display section 106, in such a manner that a positional relationship on the frequency axis between frequency bands of the bands (the available frequency bands) that can be designated for the MFBI, and frequency bands of bands that are displayed on the band display section 105 is identifiable. To be more precise, the control unit 14 performs displaying in such a manner that a portion of the frequency band, in which the bands (the selection frequency bands) that are selected as the bands which are to be used in the pseudo-base station, and the band (the available frequency band) which can be designated for the MFBI overlaps, is identifiable.

Figure 4:
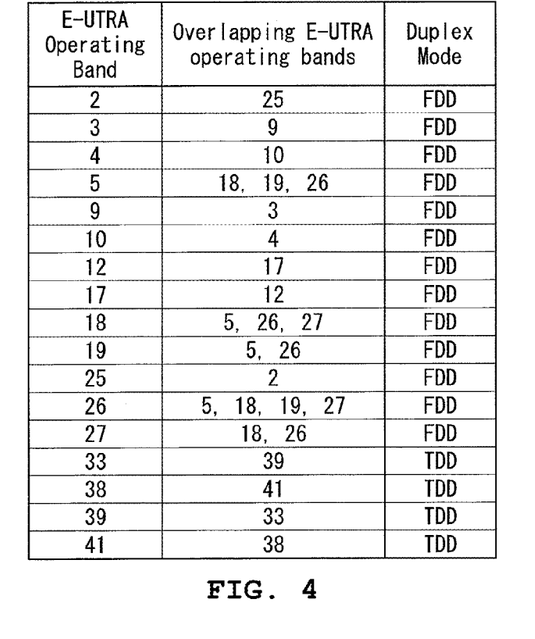
FIG. 4 is a table illustrating overlapping bands of the LTE bands that are used by the mobile terminal testing apparatus according to one embodiment of the present invention.

FIG. 2 illustrates a case where a band 5 is selected as the band (the selection frequency band) that is to be used. A frequency band of the band 5 is one in compliance with LTE specifications, and is determined as illustrated in FIG. 3. Bands whose frequency bands overlap a frequency band of the band 5 are band 18, band 19, and band 26 as illustrated in FIG. 4. The control unit 14 displays band 18, band 19, and band 26 on the MFBI display section 106, as the bands (the available frequency bands) that can be designated as MFBIs.

The MFBI check boxes 102-0 to 102-3 are for selecting the bands (the available frequency bands) that are designated for the MFBIs. When the MFBI check box 102-0 is checked, the control unit 14 sets band 18, band 19, and band 26 as the MFBIs. When the MFBI check boxes 102-1 to 102-3 are checked, the control unit 14 sets band 18, band 19, and band 26 individually for the MFBI.

The control unit 14 displays the bands (the available frequency bands) that are selected from the MFBI check boxes 102-0 to 102-3, using images different from those of the bands (the available frequency bands) that are not selected on the MFBI display section 106 in terms of the frequency band, for example, in a colored manner. Accordingly, the frequency bands of the bands (the available frequency bands) that are selected for the MFBIs can be visually checked.

In FIG. 2, because the MFBI check boxes 102-1 and 102-2 are checked, and band 18 and band 19 are selected, available frequency bands of band 18 and band 19 are displayed on the MFBI display section 106 in a colored manner, but an available frequency band of band 26 is not colored. Moreover, when a color of a frequency band of the band display section 105 is set to be different from a color of an available frequency band of the MFBI display section 106, it is easy to make a distinction between an available band that is to be used and an MFBI band.

Figure 5:
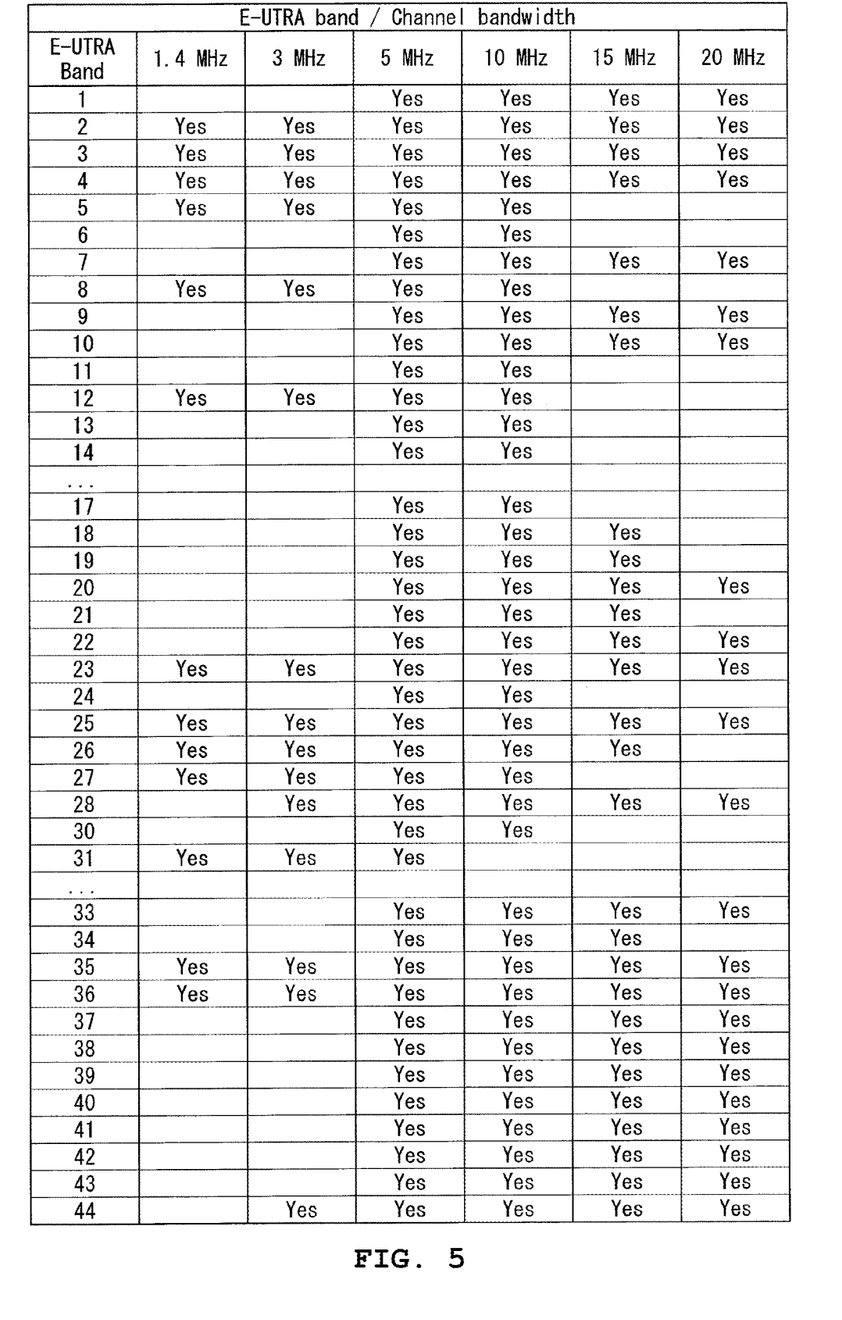
FIG. 5 is a table illustrating bandwidths of the LTE bands that are supported by the mobile terminal testing apparatus according to one embodiment of the present invention.

A bandwidth drop-down list 103 is for setting a frequency bandwidth that is to be used for communication in the pseudo-base station. Whether or not the bandwidth corresponds to every band is determined as illustrated in FIG. 5. A bandwidth of "3 MHz" that is illustrated in FIG. 2 corresponds to band 5, but does not correspond to band 18 and band 19. In a case where the bandwidth that is selected from the bandwidth drop-down list 103 does not correspond to the bands that are selected from the MFBI check boxes 102-0 to 102-3, the control unit 14 displays a bandwidth warning indication 111 on a corresponding-band portion of the MFBI display section 106.

A center frequency slider 104 is for setting a center frequency of the frequency band that is to be used. The farther the center frequency slider 104 goes to the left, the more the center frequency the control unit 14 decreases. The farther the center frequency slider 104 goes to the right, the more the center frequency the control unit 14 increases.

The control unit 14 displays a frequency and a channel number that correspond to a position of the center frequency slider 104, on a frequency display section 107 and a channel number display section 108, respectively.

Furthermore, the control unit 14 displays a center frequency bar 109 and a frequency band frame 110 at a position of a frequency that corresponds to a position of the center frequency slider 104, on portions of the band display section 105 and the MFBI display section 106, on which the frequency band is displayed.

According to a motion of the center frequency slider 104, the control unit 14 moves the center frequency bar 109 to the position of the frequency that corresponds to the position of the center frequency slider 104, and moves the frequency band frame 110 as well together with the center frequency slider 104. The control unit 14 changes a width of the frequency band frame 110 according to a bandwidth that is selected from the bandwidth drop-down list 103 and displays the changed width.

As with band 18 in FIG. 2, in a case where a center frequency that is designated with the center frequency slider 104 is inside a frequency band of the band, but any one of both ends of the bandwidth that is selected from the center frequency in the bandwidth drop-down list 103 is outside the frequency band of the band, the control unit 14 displays a bandwidth-out-of-band warning indication 112 on the corresponding-band portion of the MFBI display section 106.

Furthermore, as with band 19 in FIG. 2, in a case where the center frequency that is designated with the center frequency slider 104 is not inside the frequency band of the band, the control unit 14 displays a center frequency-out-of-band warning indication 113 on the corresponding-band portion of the MFBI display section 106.

In this manner, because the frequency band of the band that is to be used and the frequency band of the band (the available frequency bands) that can be designated as the MFBI are displayed on the band display section 105 and the MFBI display section 106, respectively, a portion in which the frequencies of the bands overlaps can be checked visually, and setting of the MFBI can be performed easily.

Furthermore, the center frequency bar 109 and the frequency band frame 110 are displayed superimposed on the frequency band of each band, how the center frequency and the frequency bandwidth that are intended for use cover each band can be checked visually, and the setting of the MFBI can be performed easily.

Furthermore, because the width of the frequency band frame 110 is changed and displayed according to the bandwidth that is selected from the bandwidth drop-down list 103, the frequency bandwidth can be checked visually, and the setting of the MFBI can be performed easily.

Furthermore, because the bands (the available frequency bands) that can be set for the MFBI that corresponds to the frequency band (the selection frequency band) that is selected from the band drop-down list 101 are displayed on the MFBI check boxes 102-0 to 102-3, the MFBI band can be set without being searched for and the setting of the MFBI can be performed easily.

Furthermore, in a case where the bandwidth that is selected from the bandwidth drop-down list 103 does not correspond to the band that is selected as the band that is set for the MFBI, because the bandwidth warning indication 111 is displayed, it can be checked easily that the bandwidth does not correspond to the band that is selected.

Furthermore, in the case where the center frequency that is designated with the center frequency slider 104 is inside the frequency band of the band, but any one of both ends of the bandwidth that is selected from the center frequency in the bandwidth drop-down list 103 is outside the frequency of the band, because the bandwidth-out-of-band warning indication 112 is displayed, it can be checked easily that the frequency band that is intended for use stays out of the frequency band of the band.

Furthermore, in a case where the center frequency that is designated with the center frequency slider 104 is not inside the frequency band of the band, because the center frequency-out-of-band warning indication 113 is displayed, it can be checked easily that the center frequency stays out of the frequency band of the band.

Moreover, FIG. 2 illustrates a screen for setting a down link (a link from the mobile terminal testing apparatus 1 to the mobile communication terminal 2), but the same processing can also be performed in the case of setting an uplink (a link from the mobile communication terminal 2 to the mobile terminal testing apparatus 1).

The control unit 14 transmits information on the MFBI that is set with the screen as illustrated in FIG. 2, for example, scenario information of the pseudo-base station, including a band to be used, a center frequency, a bandwidth, a band that is set for the MFBI, and the like, to the scenario generation unit 15.

Based on the received scenario information of the pseudo-base station, the broadcast information generation unit 151 of the scenario generation unit 15 generates the information on the MFBI and the like and sets the generated pieces of information for related pieces of broadcast information, for example, System Information Block Type1, System Information Block Type2, and the like.

The scenario generation unit 15 stores the scenario for the pseudo-base station, which is generated in this manner, for example, in the storage unit 16, in such a manner that the scenario is identifiable by the identification information that is input by the user.

In a case where setting of an in-cell arrangement in the scenario for the pseudo-base station, which is created in this manner is performed, the user selects the setting of the in-cell arrangement by operating the operation unit 11.

When the setting of the in-cell arrangement is selected by the user operating the operation unit 11, the control unit 14 reads, for example, pieces of identification information of the scenarios for the pseudo-base stations that are stored in the storage unit 16, displays the pieces of identification information that are read, in the form of a list, on the display unit 12, and displays a message for making a selection of the scenario for the pseudo-base station that performs the setting of the in-cell arrangement.

When the scenario of the pseudo-base station that performs the setting of the in-cell arrangement is selected by the user operating the operation unit 11, for example, the control unit 14 displays an icon of a cell that corresponds to the selected scenario for the pseudo-base station, on the display unit 12, and changes a position of the icon due to the user operating the operation unit 11 and performs the setting of the in-cell arrangement using the position of the icon.

When completion of the setting of the in-cell arrangement by the user operating the operation unit 11 is selected, the control unit 14 determines a cell neighborhood relationship from the position of the icon that is displayed on the display unit 12, generates information on the in-cell arrangement, and transmits the generated information on the in-cell arrangement and identification information of the selected scenario for the pseudo-base station to the scenario generation unit 15. Furthermore, the control unit 14 stores the information on the in-cell arrangement and the identification information of the selected scenario for the pseudo-base station, as an in-cell arrangement scenario, in the storage unit 16, for example, in such a manner that the in-cell arrangement scenario is identifiable by the identification information that is input by the user.

When receiving the information on the in-cell arrangement and the identification information of the selected scenario for the pseudo-base station from the control unit 14, the scenario generation unit 15 causes the broadcast information generation unit 151 to generate the broadcast information of the scenario for the pseudo-base station, based on the information on the in-cell arrangement.

Based on the information on the in-cell arrangement, the broadcast information generation unit 151 generates information on the MFBI and the like and sets the generated pieces of information for related pieces of broadcast information, for example, System Information Block Type5 and the like.

Furthermore, even in a case of a wireless system (Radio Access Technology (InterRAT)) in which neighboring cells are different, the broadcast information generation unit 151 generates the information on the MFBI and sets the generated information on the MFBI for System Information Block Type19 (Wideband Code Division Multiple Access (W-CDMA), and Time Division-Synchronous Code Division Multiple Access (TD-SCDMA)), System Information 2 quarter (Global System for Mobile communications (GSM) (a registered trademark)/General Packet Radio Service (GPRS)), Alternative Technologies Information Message (CDMA2000 1x), Other RAT Neighbour List Message (CDMA2000 1xEV-DO), and the like.

With the generated broadcast information, the scenario generation unit 15 changes the scenario for the pseudo-base station that is stored in the storage unit 16.

In a case where the scenario that is generated in this manner is used, the user selects the setting of the scenario by operating the operation unit 11.

When the setting of the scenario is selected by the user operating the operation unit 11, the control unit 14 reads, for example, pieces of identification information of the scenarios for the pseudo-base stations and of the scenarios for the in-cell arrangements, which are stored in the storage unit 16, displays the pieces of identification information that are read, in the form of a list, on the display unit 12, and displays a message for making a selection of the scenario that is to be set.

When the scenario for the pseudo-base station is selected by the user operating the operation unit 11, the control unit 14 transmits the identification information of the selected scenario for the pseudo-base station to the scenario processing unit 17.

When receiving the identification information of the scenario for the pseudo-base station from the control unit 14, the scenario processing unit 17 reads the scenario for the pseudo-base station that corresponds to the identification information, from the storage unit 16, and causes the pseudo-base station unit 18-1 to perform processing in accordance with the scenario for the pseudo-base station.

Furthermore, when the scenario for the in-cell arrangement is selected by the user operating the operation unit 11, the control unit 14 transmits the identification information of the selected scenario for the in-cell arrangement to the scenario processing unit 17.

When receiving the identification information of the scenario for the in-cell arrangement from the control unit 14, the scenario processing unit 17 reads the scenario for the in-cell arrangement that corresponds to the identification information, from the storage unit 16, reads the scenario for the pseudo-base station from the identification information of the scenario for the pseudo-base station, which is associated with the scenario for the in-cell arrangement, and causes the pseudo-base station units 18-1 to 18-3, which correspond to the number of scenarios for the pseudo-base station, to perform processing in accordance with the scenario for the pseudo-base station.

When the scenario is set in this manner, and the processing by each of the pseudo-base station units 18-1 to 18-3 is started, the pseudo-base station units 18-1 to 18-3 transmit information of the pseudo-base station or information of the connected mobile communication terminal 2, to the scenario processing unit 17.

The pseudo-base station units 18-1 to 18-3 generate information of the pseudo-base station from contents of the broadcast information that is transmitted, or from states of a radio signals that are transmitted and are received, and transmits the generated information to the scenario processing unit 17. Furthermore, the pseudo-base station units 18-1 to 18-3 generate information of the mobile communication terminal 2 from control signal and the like that are transmitted and are received to and from the mobile communication terminal 2, and transmit the generated information to the scenario processing unit 17.

The scenario processing unit 17 transmits the information of the pseudo-base station or the information of the connected mobile communication terminal 2, which is received from each of the pseudo-base station units 18-1 to 18-3, to the control unit 14, with identification information for identifying each of the pseudo-base station units 18-1 to 18-3 being attached to the transmitted information.

Figure 6:
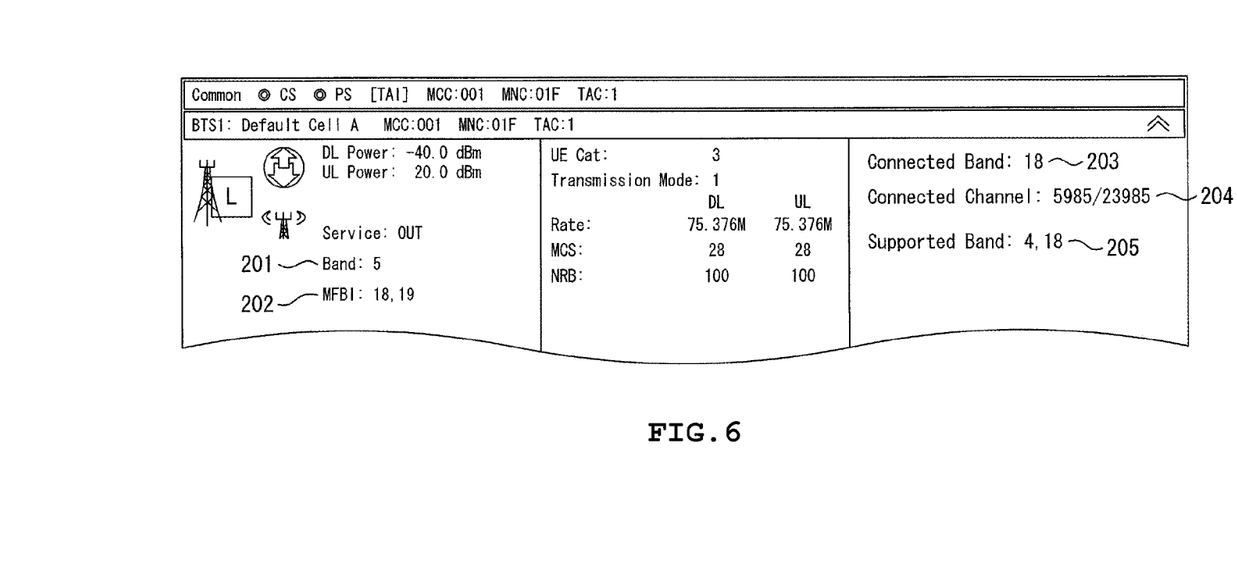
FIG. 6 is a diagram illustrating a state display screen of a pseudo-base station, which is displayed on the mobile terminal testing apparatus according to one embodiment of the present invention.

When receiving the information of the pseudo-base station or the information of the connected mobile communication terminal 2 from the scenario processing unit 17, the control unit 14 displays a state display screen for each of the pseudo-base station units 18-1 to 18-3, as illustrated in FIG. 6, on the display unit 12.

In FIG. 6, the control unit 14 displays numbers of bands that are used by the pseudo-base station units 18-1 to 18-3, on a band display section 201. The control unit 14 displays the information on the MFBI that is set for the broadcast information, on an MFBI display section 202.

Furthermore, the control unit 14 displays a number of a band in which the mobile communication terminal 2 is connected, as the information of the mobile communication terminal 2, on a connection band display section 203. The control unit 14 displays a number of a channel in which the mobile communication terminal 2 is connected, on a connection channel display unit 204. The control unit 14 displays a number of a band that can be used by the mobile communication terminal 2, on a support band display unit 205.

Because a connection band of the mobile communication terminal 2, an available band, or the like is displayed in this manner on the display unit 12, a state of the mobile communication terminal 2 is identifiable easily, and testing can be performed easily.

For example, as illustrated in FIG. 6, when it is known that numbers of bands that are supported by the mobile communication terminal 2 are 4 and 18, a number of a band that is used by the pseudo-base station is 5, and MFBIs are 18 and 19, a channel having band 18 is designated as a handover destination and a handover terminates normally. Thus, the user can perform normal testing of a handover easily and check a result of the normal testing.

Furthermore, because a channel having band 5 that is not supported by the mobile communication terminal 2 is designated as the handover destination, the handover cannot take place. Thus, the user can perform semi-normal testing easily and check a result of the semi-normal testing.

In this manner, according to the embodiment described above, the control unit 14 is included that displays the band display section 105 and the MFBI display section 106 on the display unit 12. The position on the frequency axis, of the frequency band (the selection frequency band) that is selected as the frequency which is used by the pseudo-base station is displayed on the band display section 105 when the information on the MFBI is set. The position on the frequency axis, of the frequency band (the available frequency bands) that can be set as the MFBI with which the selection frequency band is overlapping is displayed on the MFBI display section 106, in such a manner that the positional relationship between the position on the frequency axis, of the available frequency band that can be set as the MFBI, and the selection frequency band is identifiable.

Accordingly, the relationship between the selection frequency band and the available frequency band that can be set as the MFBI is displayed on the display unit 12. For this reason, a portion in which the selection frequency band and the available frequency band that can be set as the MFBI overlap can be checked visually, and the testing using the MFBI can be performed easily.

Furthermore, the control unit 14 displays the center frequency bar 109 indicating a position of a center frequency that is selected as a center frequency that is used by the pseudo-base station for communication, on the display unit 12, in a state of being superimposed on the band display section 105 and the MFBI display section 106.

Accordingly, a relationship between the center frequency that is selected as the center frequency which is used by the pseudo-base station for communication, the selection frequency band, and the available frequency band that can be set as the MFBI is displayed on the display unit 12. For this reason, the center frequency that is selected as the center frequency which is used by the pseudo-base station, and the portion in which the selection frequency band and the available frequency band that can be set as the MFBI overlap can be checked visually, and the testing using the MFBI can be performed easily.

Furthermore, the control unit 14 displays the frequency band frame 110 on the display unit 12, in a state of being superimposed on the center frequency bar 109.

Accordingly, the center frequency bar 109 and the frequency band frame 110 are displayed on the display unit 12, in a state of being superimposed on the band display section 105 and the MFBI display section 106. For this reason, the center frequency and the bandwidth that are selected as the center frequency and the bandwidth, respectively, and that are used by the pseudo-base station for communication, and the portion in which the selection frequency band and the available frequency band that can be set as the MFBI overlap can be checked visually, and the testing using the MFBI can be performed easily.

Furthermore, the control unit 14 displays the available frequency band that is selected as the frequency band which is set as the MFBI, and the available frequency band that is not selected as the frequency band which is set as the MFBI, in different colors, on the MFBI display section 106.

Accordingly, the available frequency band that is selected as the frequency band which is set as the MFBI, and the available frequency band that is not selected as the frequency band which is set as the MFBI are displayed in different colors, on the display unit 12. For this reason, the available frequency band that is selected as the frequency band which is set as the MFBI, and the available frequency band that is not selected as the frequency band which is set as the MFBI can be checked visually, and the testing using the MFBI can be performed easily.

The embodiment of the present invention is disclosed, but it is apparent to a person of ordinary skill in the related art that modifications to the embodiment are possible within the scope that does not depart from the nature and gist of the present invention. All of these modifications and equivalents are intended to be included in the following claims.

DESCRIPTION OF REFERENCE NUMERALS AND SIGNS

1 MOBILE TERMINAL TESTING APPARATUS
2 MOBILE COMMUNICATION TERMINAL
11 OPERATION UNIT
12 DISPLAY UNIT
13 DISPLAY CONTROL UNIT
14 CONTROL UNIT
15 SCENARIO GENERATION UNIT
16 STORAGE UNIT
17 SCENARIO PROCESSING UNIT
18-1 TO 18-3 PSEUDO-BASE STATION UNIT
19 COMBINATION UNIT

What is claimed is:

1. A mobile terminal testing apparatus that tests a mobile communication terminal by simulating a mobile-communication base station, the mobile terminal testing apparatus comprising:
a pseudo-base station unit that simulates the mobile-communication base station;
a display unit; and
a control unit that displays a setting image for performing various settings, on the display unit,
wherein, when information on a multi-frequency band indicator (MFBI) is set, the control unit displays on the display unit an image indicating a position on a frequency axis, of a selection frequency band that is selected as a frequency band which is used by the pseudo-base station unit, and displays on the display unit an image indicating a position on the frequency axis, of an available frequency band that is able to be set as the MFBI with which the selection frequency band is overlapping, in such a manner that a positional relationship on the frequency axis between the image indicating the position on the frequency axis, of the available frequency band and the image indicating the position on the frequency axis, of the selection frequency band is identifiable.

2. The mobile terminal testing apparatus according to claim 1,
wherein the control unit displays on the display unit an image indicating a position of a center frequency that is selected as a center frequency which is used by the pseudo-base station unit for communication, in a state of being superimposed on the image indicating the position of the selection frequency band and the image indicating the position on the frequency axis, of the available frequency band that is able to be set as the MFBI.

3. The mobile terminal testing apparatus according to claim 2,
wherein the control unit displays on the display unit an image indicating a bandwidth that is selected as a bandwidth which is used by the pseudo-base station unit for communication, in a state of being superimposed on the image indicating the position of the center frequency.

4. The mobile terminal testing apparatus according to claim 1,
wherein the control unit sets the image indicating the position on the frequency axis, of the available frequency band that is able to be set as the MFBI, to be an image that is different for the available frequency band that is selected as the MFBI which is used by the pseudo-base station unit, and the available frequency band that is not selected as the MFBI which is used by the pseudo-base station unit.

5. A scenario information setting method for use in a mobile terminal testing apparatus that includes a pseudo-base station unit that tests a mobile communication terminal and that simulates a mobile-communication base station, the scenario information setting method comprising:
displaying an image indicating a position on a frequency axis, of a selection frequency band that is selected as a frequency band which is used by the pseudo-base station unit when information on a multi-frequency band indicator (MFBI) is set; and
displaying an image indicating a position on the frequency axis, of an available frequency band which is able to be set as the MFBI with which the selection frequency band is overlapping, in such a manner that a positional relationship on the frequency axis between the image indicating the position on the frequency axis, of the available frequency band and the image indicating the position on the frequency axis, of the selection frequency band is identifiable.

6. The scenario information setting method according to claim 5, further comprising:
displaying an image indicating a position of a center frequency that is selected as a center frequency which is used by the pseudo-base station unit for communication, in a state of being superimposed on the image indicating the position on the frequency axis, of the selection frequency band and the image indicating the position on the frequency axis, of the available frequency band that is able to be set as the MFBI.

7. The scenario information setting method according to claim 6, further comprising:
displaying an image indicating a bandwidth that is selected as a bandwidth which is used by the pseudo-base station unit for communication, in a state of being superimposed on the image indicating the position of the center frequency.

8. The scenario information setting method according to claim 5, further comprising;
displaying the image indicating the position on the frequency axis, of the available frequency band that is able to be set as the MFBI, as an image that is different for the available frequency band that is selected as the MFBI which is used by the pseudo-base station unit, and the available frequency band that is not selected as the MFBI which is used by the pseudo-base station unit.

* * * * *